United States Patent [19]

Reimann

[11] Patent Number: 4,460,470

[45] Date of Patent: Jul. 17, 1984

[54] PROCESS AND APPARATUS FOR THE BIOLOGICAL PURIFICATION OF PHOSPHATE-CONTAINING WASTEWATER

[75] Inventor: Hans Reimann, Munich, Fed. Rep. of Germany

[73] Assignee: Linde Aktiengesellschaft, Wiesbaden, Fed. Rep. of Germany

[21] Appl. No.: 468,835

[22] Filed: Feb. 23, 1983

[30] Foreign Application Priority Data

Feb. 23, 1982 [DE] Fed. Rep. of Germany ....... 3206444

[51] Int. Cl.$^3$ ............................................. C02F 3/30
[52] U.S. Cl. .................................... 210/605; 210/608; 210/612; 210/625; 210/630; 210/631; 210/195.3; 210/221.1; 210/906
[58] Field of Search ............ 210/608, 605, 625, 221.2, 210/906, 703, 704–706, 630, 612, 631, 195.1, 195.3, 197, 202

[56] References Cited

U.S. PATENT DOCUMENTS

| | | | |
|---|---|---|---|
| 3,236,766 | 2/1966 | Levin | 210/625 |
| 4,141,822 | 2/1979 | Levin et al. | 210/906 |
| 4,183,808 | 1/1980 | Ornevich | 210/906 |
| 4,267,050 | 5/1981 | Conway et al. | 210/608 |
| 4,274,959 | 6/1981 | Roediger | 210/221.2 |

Primary Examiner—Benoît Castel

Attorney, Agent, or Firm—Millen & White

[57] ABSTRACT

This invention relates to a process for the biological purification of phosphate-containing wastewater wherein the wastewater is gas-treated, i.e. aerated, in an oxygenation tank in the presence of activated sludge for degrading organic hydrocarbon compounds and absorption of phosphate by microorganisms present in the activated sludge. The wastewater-activated sludge mixture is then withdrawn from the oxygenated tank and divided, in a post clarification stage, into purified, essentially phosphate-free water and phosphate-containing sludge. The phosphate-containing sludge is recycled, at least in part, into the oxygenation tank. A partial stream of wastewater-activated sludge mixture is branched off from the oxygenation tank, and/or recycle sludge is branched off as a partial stream from the post clarification stage, and the mixture is subjected to flotation treatment for thickening. A thus-obtained, low-phosphate flotage, i.e. subnatant liquor, is discharged from the flotation unit. Likewise, resultant, phosphate-rich flotage sludge, i.e. thickened floating sludge, is discharged and heated, and after this heating, is treated anaerobically and mixed with wastewater to be purified. Subsequently, the wastewater-flotage sludge mixture is subjected to a phosphate separation and thus-produced, low-phosphate sludge is recycled into the oxygenation tank, and phosphate-enriched liquid is further treated.

40 Claims, 1 Drawing Figure

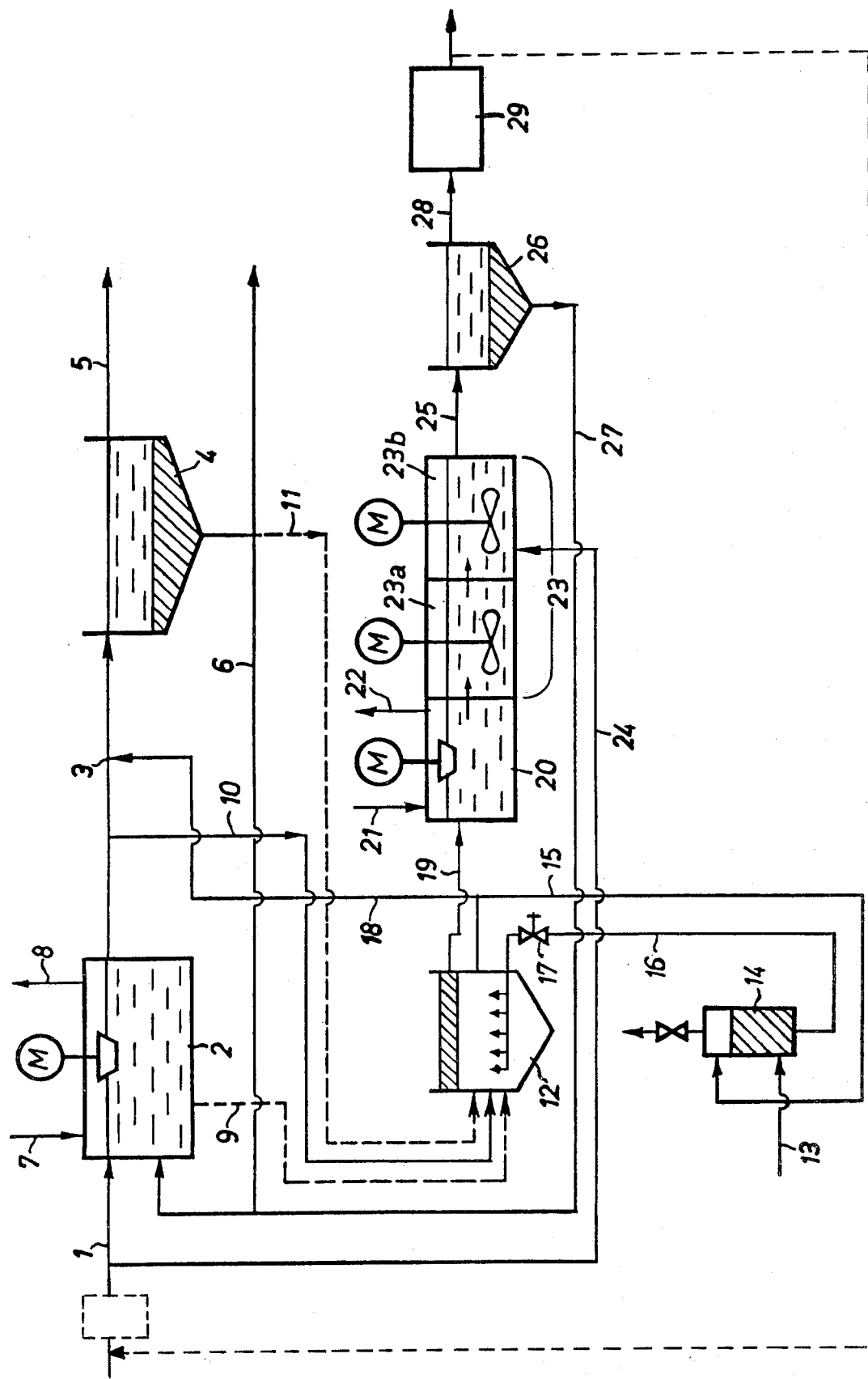

PROCESS AND APPARATUS FOR THE BIOLOGICAL PURIFICATION OF PHOSPHATE-CONTAINING WASTEWATER

BACKGROUND OF THE INVENTION

This invention relates to a process and apparatus for the biological purification of phosphate-containing wastewater wherein entering wastewater is treated with oxygen containing gas in an oxygenation or aeration tank in the presence of activated sludge for conducting degradation of organic hydrocarbon compounds and absorption of phosphate by microorganisms present in the activated sludge. The wastewater-activated sludge mixture is then withdrawn from the oxygenation tank and divided, in a post-clarification stage, into purified, essentially phosphate-free water and phosphate-containing sludge, with the phosphate-containing sludge, at least in part, fed as recycle sludge into the oxygenation or aeration tank.

One such prior art process for the separation of phosphates from wastewater is described, for example, in U.S. Pat. No. 4,141,822. In this process, phosphate-enriched sludge is fed to a phosphate separation stage and caused to settle therein. At least a portion of the settled sludge is maintained under anaerobic conditions for a sufficient time period to cause release of phosphate into the liquid phase of the settled sludge. This liquid phase then rises into the supernatant liquor and forms a phosphate-enriched liquid. Subsequently, a portion of the settled and thickened, low-phosphate sludge is recycled from the lower section of the phosphate separating zone as activated sludge into the oxygenation and/or aeration tank for conducting the activated sludge treatment. In order to accelerate passing of the phosphate released into the liquid phase of the anaerobic sludge into the supernatant liquid, the anaerobic sludge is brought into contact with an aqueous medium having a lower phosphate content than the anaerobic sludge.

However, this process has the disadvantage that the phosphate separating unit must be of a very large size to permit the necessary long residence times so that the sludge can thicken adequately. Moreover, because of the step of contacting with an aqueous medium, i.e. elutriation, the secondary stream to be treated is also increased highly to a disadvantageous size. Another drawback of this process is that the activated sludge releases the phosphate only gradually at low temperatures, especially during winter months, so that the residence times in the phosphate separation zone are unnecessarily prolonged.

SUMMARY OF THE INVENTION

It is therefore an object of the present invention to provide a process for conducting activated sludge treatment and phosphate removal on an incoming wastewater stream, which eliminates the above-discussed disadvantages and thus, renders phosphate removal more economical.

It is also an object to provide an apparatus for conducting such a process.

Upon further study of the specification and appended claims, further objects and advantages of this invention will become apparent to those skilled in the art.

In accordance with this invention, a wastewater-activated sludge mixture treated in an oxygenation or aeration tank is branched off from this tank and/or from a recycle sludge line from a post-clarification stage, and subjected to a flotation unit operation for conducting thickening and separation of solid or liquid particles from a liquid phase.

Both low-phosphate flotage, and phosphate-rich flotage sludge are withdrawn, and the phosphate-rich flotage sludge is subjected to heating to a temperature of about 20°–35° C., preferably 25°–30° C. This heated phosphate-rich flotage sludge is then treated anaerobically and mixed with an aqueous phase, preferably of wastewaters*, Thereafter, the wastewater-flotage sludge mixture is subjected to settling, and low-phosphate sludge thus-obtained is recycled into the oxygenation tank, and the phosphate-enriched liquid is treated further, for example, in a phosphate precipitation. For purposes of this description, it should be noted that as discussed above and hereinafter, the term "flotage" or "low-phosphate flotage" will refer to subnatant liquor or liquid in the flotation unit, and the term "flotage sludge" or "phosphate-enriched flotage sludge" will refer to thickened or concentrated biological sludge formed on the surface.

*where by phosphate is released from the sludge to the liquid phase.

Flotation is a unit process by which solid particles in liquid suspension become attached to microscopic air bubbles, giving the air-solids agglomerate buoyancy. Given the right conditions, the agglomerate will rise to the surface to join other particles and form a blanket that can be removed by mechanical means.

In dissolved air flotation units, the feed to the unit may be admixed with recycled flow prior to entry into the main flotation compartment, although not all units use recycling. The recycled flow may vary up to 100 percent of the influent and be pressurized up to 520 kN/m$^2$ (75 psig). Air is admitted to the pressurization circuit and dissolved into the recycle flow. As the recycled flow is admitted back into the flotation compartment, pressure is released and minute bubbles are formed. These minute bubbles attach to sludge particles and float to the surface as a froth. To eliminate the shearing of sludge particles and to take advantage of the dissolved air content, the recycle stream generally consists of effluent from the flotation unit effluent.

The sludge particles are floated to a sludge blanket and the clarified effluent withdrawn under a baffle and over an adjustable weir. Removal of suspended solids from the subnatent will range from 94 to over 99 percent.[8] The floated sludge is skimmed from the tank with an adjustable mechanism. In general, the sludge blanket on top of the flotation device will be 150 to 300 mm (6 to 12 in.) thick. Because some of the heavier solids will settle (and to a greater extent if primary sludge is also present), a floor scraper is provided to remove settled solids periodically.

Because of the heating step, and the subsequent anaerobic treatment, an extensive and rapid release of phosphate from the microorganisms into the liquid phase of the thickened sludge is achieved. The subsequent addition of wastewater permits the phosphate released from the microorganisms to enter the liquid so that substantially complete phosphate separation can be effected. At least 70% and typically 90% of the released phosphate is separated from the sludge phase.

In this connection, alternately to treating a portion of the recycle sludge from the post-clarification in the manner discussed, it is also possible to treat a wastewater-activated sludge mixture from the oxygenation tank itself, as well as the effluent from the discharge means of the oxygenation tank. The choice of one of these alternatives depends on which of these streams gives the best thickening performance with the flotation unit.

The process of this invention permits improved separation of the low-phosphate sludge from the phosphate-rich liquid in a substantially shorter period of time, independently of the time of year. Thus, even relatively small installations can be utilized, especially for the post-clarification and the phosphate separation steps, with the installations being considerably cheaper to manufacture than those of the prior art.

In a further development of the process of this invention, the phosphate-enriched liquid obtained from phosphate separation is subjected to phosphate precipitation, and then optionally recycled to the oxygenation tank. Heating of the flotage sludge from the flotation separation step is conducted preferably up to a temperature of 20°–35° C., more preferably 25°–30° C. The heating is advantageously conducted autothermically by aeration with air or oxygen, i.e. hereinafter autothermically or autothermic heating will refer to heating by mixing with gas such as by aeration with air or oxygen and thereby oxidizing a fraction of the organic sludge content by biological metabolism, generating a heat of oxidation* Alternatively, the heating is conducted by means of an external heat source, i.e. waste heat. The costs incurred by such a system are negligible when compared to the savings obtained by the use of smaller installations, and in view of the resultant higher throughput quantities, as well as from increased cleaning efficiencies. More particularly, in the summer when temperatures of the wastewater and activated sludge reach about 18°–20° C., it is possible to raise the temperature of the mixture to the above-discussed desired temperatures by merely conducting autothermic heating by aeration. In the wintertime, with wastewater or activated sludge temperatures of, on the average, only about 8°–10° C., additional heating by means of an external heat source has proven to be most expedient.
*(A. A. Kalinske AICAE Symp. Ser. No. 151, Vol. 71, "Water-1975", p. 34–39)

In accordance with another preferred embodiment, a pH of 4–7, preferably 5.5–6.5, is set during the anaerobic treatment, to cause the phosphate to be released by the bacteria into the liquid in an accelerated fashion.

Moreover, it is also possible in accordance with this invention, to introduce the low-phosphate flotage, in part, to the wastewater-activated sludge mixture from the oxygenation tank prior to the post-clarification, so that any solids still present can be settled in the post-clarification. It is also possible to feed the other part of the low phosphate flotage to a stage wherein it is enriched with flotation gas and recycled into the flotation stage.

The invention also relates to an apparatus for conducting the process of the invention wherein an oxygenation tank and a post clarification device are connected through a discharge means of the oxygenation tank with the post-clarification arranged downstream of the oxygenation tank and includes a sludge recycle conduit to the oxygenation tank. The apparatus is characterized by having the oxygenation tank and/or the discharge means of the oxygenation tank, and/or the sludge recycle means connected to a flotation separation basin having flotage discharge means and a flotage sludge discharge conduit. This flotation separation basin operates as a thickener with the flotage sludge discharge conduit connected to a heat treatment zone. The heat treatment zone is connected to and followed by an anerobic treatment zone having feed means for a partial flow of incoming wastewater to be purified. There is a phosphate separating unit connected downstream from the anaerobic treatment zone, and the phosphate separating unit comprises a sludge recycle to the oxygenation tank as well as discharge means for phosphate-enriched liquid separated therein.

The apparatus is preferably arranged so that the heat treatment zone is a gas treatment, i.e. aeration, zone, wherein heating of the materials therein is conducted, as defined previously, by autothermic heating, and the phosphate separating unit is advantageously a settling tank. A device for phosphate precipitation can be arranged at the discharge of the phosphate separating unit, with this phosphate precipitation device then being optionally connected to the oxygenation tank, if necessary, through a preliminary clarifier.

According to another embodiment of the apparatus of this invention, a mixing zone is arranged downstream from the heat treatment zone and after the anaerobic treatment zone, and the mixing zone is connected to the feed means for incoming wastewater to be treated.

The anaerobic treatment zone can advantageously be made up of two stages, with the feed means for incoming wastewater to be purified being in communication with the second stage of such as anaerobic treatment zone. Furthermore, the first stage of the anaerobic zone is also a mixed zone, with e.g., mixing conducted by paddles.

Furthermore, the flotage discharge means can be connected to, on the one hand, the oxygenation tank discharge means for receiving the flow therefrom, and on the other hand, with a saturating device for providing flotation gas, and which is connected to the flotation stage or basin.

The process of this invention, as well as the associated apparatus, are adapted for use in all wastewater treatment plants for phosphate separation.

BRIEF DESCRIPTION OF THE DRAWING

Various other objects, features and attendant advantages of the present invention will be more fully appreciated as the same becomes better understood when considered in conjunction with the accompanying drawing, in which like reference characters designate the same or similar parts throughout the several views, and wherein:

The FIGURE schematically illustrates a system for conducting the process of the invention.

DETAILED DISCUSSION

The illustrated wastewater treatment plant generally includes feed means 1, i.e. a conduit, for incoming phosphate-containing wastewater to be purified, an oxygenation tank 2 having discharge means leading to a subsequently arranged post-clarification tank 4. The post-clarification tank further comprises discharge means 5 for purified wastewater, and a sludge recycle conduit 6 to the oxygenation tank 2. In this embodiment, the oxygenation tank 2 is covered with respect to the atmosphere because substantially pure oxygen or oxygen-enriched air is used. However, when air is used for aeration, the oxygenation tank can also be of open construction. In the present case, the oxygen utilized for aeration is fed through conduit 7 and introduced conventionally, for example, through gas spargers arranged in close proximity to the tank bottom or by means of surface aerators. Waste gas from oxygen consumption can be blown off, i.e. discharged, through conduit 8.

The phosphate-containing wastewater to be purified passes through the feed means 1 into the oxygenation tank 2, is therein mixed with recycle sludge from conduit 6 with oxygen introduced thereinto for causing the microorganisms present in the activated sludge to degrade substantially all the organic hydrocarbon compounds and to absorb phosphate present in the wastewater. This degradation is typically 80-90% and the absorption typically 80-95%. The treated wastewater-activated sludge mixture is withdrawn through discharge means 3 from the oxygenation tank 2 and fed to the post-clarification tank 4 from which the purified, essentially phosphate-free water is withdrawn through conduit 5. The settled, phosphate-containing sludge in the post-clarification tank 4 is recycled through the sludge return conduit 6 at least partially into the oxygenation tank 2. Normally, 70-90% of the underflow is recycled in this way.

To conduct phosphate separation, a wastewater-activated sludge mixture stream is withdrawn from the oxygenation tank through a conduit 9, or alternately from the oxygenation tank discharge means through a conduit 10, or alternately to withdraw recycle sludge from the post-clarification tank 4 through a tap line 11 connected to conduit 6. One of these streams is fed to a flotation basin 12 which is operated as a thickener. For more information regarding flotation thickening, reference is made to the text "Wastewater Engineering", 2nd Ed., Metcalf and Eddy, McGraw Hill, pp. 221-227. In the flotation basin 12, the partial stream fed thereinto to be treated is subjected to a flotation treatment and/or thickening by means of, for example, an air feed. The flotation gas, i.e. air, is fed, in this case, to a saturating device 14 through a conduit 13 and therein mixed with a partial stream of flotage, i.e. subnatant liquid, discharged from the flotation basin through a drain 15 withdrawn under a baffle from the basin, whereby this flotage is enriched with air under pressure, and conducted through conduit 16, having an expansion valve 17, into the lower portion of the flotation basin. As a result of expansion in valve 17, the air is again freed with resultant bubble formation to carry the sludge in the flotation basin 12 upwardly. Since flotation occurs under aerobic conditions, the microorganisms do not release the phosphate stored in their cells during this treatment, so that the thus-formed flotage sludge on the surface is rich in phosphate, and the flotage below is low in phosphate. The sludge floats on the surface in a blanket of about 200 mm thickness.

The flotation effluent is thus, as described above, enriched with flotation gas, in part recycled into the flotation basin, and, in part admixed through conduit 18 to the effluent from the oxygenation tank at 3. In this manner, any solid matter which may still be present in the flotage, is admixed to the wastewater-activated sludge mixture discharged from the oxygenation tank 2, and is settled in the post-clarification tank 4.

The phosphate-rich flotage sludge is withdrawn from the flotation basin 12 through conduit 19, and heated in a heat treatment zone, preferably to temperatures of 20°-35° C., and more preferably 25°-35° C. As shown in the FIGURE, heating is conducted autothermically by means of aeration in a zone 20 which, in the case when $O_2$ is used as the aeration gas, is covered with respect to atmosphere. The aeration gas is conventionally introduced through a conduit 21 as discussed with reference to oxygenation tank 2, and waste gas consumed by the microorganisms in the activated sludge is discharged through conduit 22. Alternatively, the flotage sludge can also be heated by means of an external heat (not shown).

The heated flotage sludge is then further treated anaerobically in an anaerobic treatment zone 23, made up of two stages in this embodiment, i.e. in this zone is fed to the first treatment stage 23a. In this first stage 23a, the microorganisms, in the relatively warm surroundings, rapidly release the phosphates stored in their cells into the liquid phase of the thickened sludge. Subsequently, in the second treatment stage 23b, wastewater is admixed to the pretreated sludge through a conduit 24 connected to the feed means 1, with the result that the content of the second treatment stage 23b is cooled down somewhat as compared to the first stage 23a. This aids to a better flocculation and thus better settling of the sludge in the subsequent settling stage. The thus introduced wastewater serves primarily as a medium into which the released phosphate can pass. In addition, the anaerobic metabolism of the microorganisms is stimulated by the increased substrate provided by the incoming wastewater, so that even more phosphate is released.

Alternatively, it is also possible to admix wastewater from some other source to the pretreated, i.e. the thickened and heated sludge. The anaerobic treatment zone can also comprise only a single stage, and wastewater can be admixed prior to conducting the anaerobic treatment, for example, in a prior arranged mixing zone.

The wastewater-flotage sludge mixture is then withdrawn through a conduit 25 from the anaerobic treatment zone 23 and fed to a phosphate separating unit 26 which is, for example, a settling tank. In this unit, the phosphate-rich liquid is separated from the low-phosphate sludge which is then recycled to the oxygenation tank 2 through conduit 27. The phosphate-rich liquid, in contrast can simultaneously be fed through a discharge conduit 28 to a device 29 for phosphate precipitation, and then optionally to the oxygenation tank 2, if necessary, through a preliminary clarifier, which settles out the precipitated phosphate. This clarifier may be a primary clarifier ahead of the biological unit. A recycle to the oxygenation tank may be desirable in case that the precipitated liquid contains biologically destructable organic matter.

An additional feature which can be provided enables, during the anaerobic treatment, maintaining a pH value favorable to the microorganisms, i.e. one between 4 and 7, more preferably 5.5-6.5, for example, through the introduction of $CO_2$.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following Table, all temperatures are set forth uncorrected in degrees Celsius; unless otherwise indicated, all parts and percentages are by weight.

| | | |
|---|---|---|
| feed rate (1) | m³/h | 1000 |
| recycle rate (6) | m³/h | 500 |
| sludge feed to flotation (11) | m³/h | 100 |
| thickened sludge to heating and anaerobic step (19) | m³/h | 25 |

-continued

| waste water feed to anaerobic step (24) | m³/h | 70 |
| feed to settler (25) | m³/h | 95 |
| aerobic retention time based on feed rate (1) | h | 2.5 |
| retention time for autothesual heating | h | 4 |
| retention time for anaerobic treatment, based on feed (19) | h | 3 |
| $BOD_5$ | mg/l | |
| influent (1) | | 100 |
| effluent (5) | | 15 |
| total phosphorus | mg/l | |
| influent (1) | | 8 |
| effluent (5) | | 0.5 |
| liquid to precipitation (28) | | 80 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

I claim:

1. In a process for the biological purification of phosphate-containing wastewater wherein the wastewater is aerated in a tank in the presence of activated sludge for degrading of organic hydrocarbon compounds and absorption of phosphate by microorganisms present in the activated sludge, the wastewater-activated sludge mixture then being withdrawn from the aerated tank and divided, in a post clarification stage, into purified, essentially phosphate-free water and phosphate-containing sludge, with the phosphate-containing sludge returned, at least in part, as recycle sludge into the aeration tank, the improvement comprising: feeding at least one of a partial stream of the wastewater-activated sludge mixture treated in the aerated tank and discharged therefrom, and at least one of a partial stream of the recycle sludge from the post-clarification stage, to a flotation separation stage for separation into a low-phosphate flotage and a thickened high-phosphate flotage sludge; separately withdrawing the low-phosphate flotage from the flotation separation stage and the thickened high-phosphate flotage sludge; heating the high-phosphate flotage sludge to a temperature above ambient temperature, and after heating, anaerobically treating the high-phosphate flotage sludge, and then mixing this high-phosphate flotage sludge with an aqueous phase; subjecting the aqueous phase-flotage sludge mixture to a phosphate separation to produce a low-phosphate sludge and a phosphate-enriched liquid; and recycling the low-phosphate sludge into the aerated tank and conducting the phosphate-enriched liquid to a further treatment step.

2. A process according to claim 1, wherein the aqueous phase mixed with the high phosphate flotage sludge is a partial stream of the incoming wastewater.

3. A process according to claim 1, wherein phosphate-enriched liquid conducted to a further treatment step is subjected to a phosphate precipitation and is then recycled to the aerated tank.

4. A process according to claim 3, wherein the heating of the high-phosphate flotage sludge is conducted autothermically by aeration with air or oxygen.

5. A process according to claim 3, wherein the high-phosphate flotage sludge is heated by means of an external heat supply.

6. A process according to claim 3, wherein the anaerobic treatment is conducted at a pH of about 4–7.

7. A process according to claim 1, wherein the high-phosphate flotage sludge is heated to a temperature of about 20°–35° C. before being subjected to the phosphate separation.

8. A process according to claim 7, wherein the anaerobic treatment is conducted at a pH of about 4–.

9. A process according to claim 7, wherein the withdrawn low-phosphate flotage is fed, in part, to the wastewater-activated sludge mixture from the aerated tank fed to the post clarification, and in part, is enriched with flotation gas and recycled to the flotation stage.

10. A process according to claim 1, wherein the heating of the high-phosphate flotage sludge is conducted autothermically by aeration with air or oxygen.

11. A process according to claim 10, wherein the withdrawn low-phosphate flotage is fed, in part, to the wastewater-activated sludge mixture from the aerated tank fed to the post clarification, and in part, is enriched with flotation gas and recycled to the flotation stage.

12. A process according to claim 1, wherein the high-phosphate flotage sludge is heated by means of an external heat supply.

13. A process according to claim 12, wherein the anaerobic treatment is conducted at a pH of about 4–7.

14. A process according to claim 12, wherein the withdrawn low-phosphate flotage is fed, in part, to the wastewater-activated sludge mixture from the aerated tank fed to the post clarification, and in part, is enriched with flotation gas and recycled to the flotation stage.

15. A process according to claim 1, wherein the anaerobic treatment is conducted at a pH of about 4–7.

16. A process according to claim 15, wherein the withdrawn low-phosphate flotage is fed, in part, to the wastewater-activated sludge mixture from the aerated tank fed to the post clarification, and in part, is enriched with flotation gas and recycled to the flotation stage.

17. A process according to claim 15 wherein said heating is conducted up to a temperature of about 25°–30° C.

18. A process according to claim 1, wherein the anaerobic treatment is conducted at a pH of about 5.5–6.5.

19. A process according to claim 18, wherein the withdrawn low-phosphate flotage is fed, in part, to the wastewater-activated sludge mixture from the aerated tank fed to the post clarification, and in part, is enriched with flotation gas and recycled to the flotation stage.

20. A process according to claim 1, wherein the withdrawn low-phosphate flotage is fed, in part, to the wastewater-activated sludge mixture from the aerated tank fed to the post clarification, and in part, is enriched with flotation gas and recycled to the flotation stage.

21. A process according to claim 1 wherein only the partial stream of the wastewater-activated sludge mixture treated in the aerated tank and discharged therefrom is fed to the flotation separation stage.

22. A process according to claim 1 further comprising conducting a partial stream of influent wastewater into said anaerobic treatment to permit phosphate released from microorganisms therein to enter the liquid phase resulting in at least 70% separation of released phosphate from the sludge phase.

23. A process according to claim 1 wherein said separately withdrawing step further comprises removing the top layer from the flotation separation stage down to a depth of about 200 mm.

24. In an apparatus for conducting a process of biological purification of phosphate-containing wastewater wherein an aerated tank having an inlet for wastewater is connected by aerated tank discharge means to a post-clarification device downstream therefrom and the post-clarification device has a discharge for separated treated water and sludge recycle means for recycling settled sludge to the aerated tank, the improvement comprising: a flotation separation basin (12) adapted for operation as a sludge thickener and having an inlet connected to at least one of the aerated tank (2), the discharge means (3) of the aerated tank (2), or the sludge recycle means (6) for receiving a partial stream therefrom, and with said flotation separation basin (12) having flotage discharge means (15) for discharging low-phosphate flotage and a flotage sludge discharge conduit (19); a heat treatment zone (20) connected to the flotage sludge discharge conduit (19) for receiving flotage sludge from the flotation separation basin; an anaerobic treatment zone (23) connected downstream of the heat treatment zone (20), and having an inlet for receiving a feed from the heat treatment zone and feed means (24) for feeding influent wastewater thereto; a phosphate separating unit (26) connected to the anaerobic treatment zone (23) for receiving a treated flow therefrom, and the phosphate separating unit (26) comprising a sludge return line (27) to the aerated tank (2) for feeding low-phosphate separated sludge to the aerated tank, and a discharge means (28) for discharging phosphate-enriched liquid.

25. An apparatus according to claim 24, wherein the heat treatment zone (20) comprises an aeration zone for conducting autothermic heating.

26. An apparatus according to claim 24, wherein the phosphate separating unit (26) is a settling tank.

27. An apparatus according to claim 26, further comprising a mixing zone connected downstream from the heat treatment zone (20), and before the anaerobic treatment zone (23), with the mixing zone connected to the feed means for wastewater.

28. An apparatus according to claim 26, wherein the anaerobic treatment zone (23) is a two stage (23a, 23b) zone, and the feed means (24) for wastewater is connected to the second stage (23b) of the anaerobic treatment zone (23).

29. An apparatus according to claim 26, wherein the flotage discharge means is connected to the aerated tank discharge means (3) for feeding a partial stream thereof to the post-clarification device and is also connected to a saturating unit (14) for flotation gas, which is connected to the flotation separation basin (12) for feeding another partial stream to the saturating unit (14) for being saturated with gas and recycled to the flotation separation basin.

30. An apparatus according to claim 24, further comprising a device (29) for phosphate precipitation arranged in the discharge means (28) of the phosphate separating unit, and the phosphate precipitation device is also connected to the aerated tank for supplying the liquid treated therein to the aerated tank.

31. An apparatus according to claim 30, further comprising a mixing zone connected downstream from the heat treatment zone (20), and before the anaerobic treatment zone (23), with the mixing zone connected to the feed means for wastewater.

32. An apparatus according to claim 30, wherein the anaerobic treatment zone (23) is a two stage (23a, 23b) zone, and the feed means (24) for wastewater is connected to the second stage (23b) of the anaerobic treatment zone (23).

33. An apparatus according to claim 30, wherein the flotage discharge means is connected to the aerated tank discharge means (3) for feeding a partial stream thereof to the post-clarification device and is also connected to a saturating unit (14) for flotation gas, which is connected to the flotation separation basin (12) for feeding another partial stream to the saturating unit (14) for being saturated with gas and recycled to the flotation separation basin.

34. An apparatus according to claim 26, further comprising a device (29) for phosphate precipitation arranged in the discharge means (28) of the phosphate separating unit, and the phosphate precipitation device also connected to the aerated tank for supplying the liquid treated therein to the aerated tank.

35. An apparatus according to claim 24, further comprising a mixing zone connected downstream from the heat treatment zone (20), and before the anaerobic treatment zone (23), with the mizing zone connected to the feed means for wastewater.

36. An apparatus according to claim 35, wherein the anaerobic treatment zone (23) is a two stage (23a, 23b) zone, and the feed means (24) for wastewater is connected to the second stage (23b) of the anaerobic treatment zone (23).

37. An apparatus according to claim 35, wherein the flotage discharge means is connected to the aerated tank discharge means (3) for feeding a partial stream thereof to the post-clarification device and is connected to a saturating unit (14) for flotation gas, which is connected to the flotation separation basin (12) for feeding another partial stream to the saturating unit (14) for being saturated with gas and recycled to the flotation separation basin.

38. An apparatus according to claim 24, wherein the anaerobic treatment zone (23) is a two stage (23a, 23b) zone, and the feed means (24) for wastewater is connected to the second stage (23b) of the anaerobic treatment zone (23).

39. An apparatus according to claim 38, wherein the flotage discharge means is connected to the aerated tank discharge means (3) for feeding a partial stream thereof to the post-clarification device and is connected to a saturating unit (14) for flotation gas, which is connected to the flotation separation basin (12) for feeding another partial stream to the saturating unit (14) for being saturated with gas and recycled to the flotation separation basin.

40. An apparatus according to claim 24, wherein the flotage discharge means is connected to the aerated tank discharge means (3) for feeding a partial stream thereof to the post-clarification device and is also connected to a saturating unit (14) for flotation gas, which is connected to the flotation separation basin (12) for feeding another partial stream to the saturating unit (14) for being saturated with gas and recycled to the flotation separation basin.

* * * * *